(12) United States Patent
Kamiya et al.

(10) Patent No.: US 8,623,443 B2
(45) Date of Patent: Jan. 7, 2014

(54) METHOD OF MANUFACTURING MIXED BEVERAGE

(75) Inventors: Yuichiro Kamiya, Nasushiobara (JP); Kiro Hayakawa, Nasushiobara (JP); Tsutomu Saito, Osaka (JP)

(73) Assignees: Kagome Co., Ltd., Nagoya-Shi (JP); Fuji Oil Compant, Limited, Osaka-Shi (JP)

( * ) Notice: Subject to any disclaimer, the term of this patent is extended or adjusted under 35 U.S.C. 154(b) by 1194 days.

(21) Appl. No.: 11/266,527

(22) Filed: Nov. 3, 2005

(65) Prior Publication Data

US 2006/0099303 A1    May 11, 2006

(30) Foreign Application Priority Data

Nov. 8, 2004 (JP) ................. P 2004-324333

(51) Int. Cl.
*A23L 2/02* (2006.01)
*A23L 2/42* (2006.01)

(52) U.S. Cl.
USPC ........................................................ 426/599

(58) Field of Classification Search
USPC .................................................. 426/599, 590
See application file for complete search history.

(56) References Cited

U.S. PATENT DOCUMENTS

| 3,666,487 A * | 5/1972 | Tamotsu et al. ................. 426/50 |
| 6,407,306 B1 | 6/2002 | Peter et al. |
| 2004/0086624 A1 | 5/2004 | Saito et al. ..................... 426/629 |

FOREIGN PATENT DOCUMENTS

| EP | 1 285 587 A1 | 2/2003 | .............. A23L 1/03 |
| JP | 5452754 | 4/1979 | |
| JP | 58020180 | 2/1983 | |
| JP | 07016084 | 1/1995 | |
| JP | 2000000077 | 1/2000 | |
| JP | 03 009585 B2 | 2/2000 | ............. A23C 9/137 |
| JP | 2001061409 | 3/2001 | |
| JP | 2001340069 | 12/2001 | |
| JP | 2002262838 | 9/2002 | |
| WO | 9855148 | 12/1998 | |
| WO | WO 02/49459 A | 6/2002 | ................. A23L 2/00 |

OTHER PUBLICATIONS

Okubo et al. Preparation of Low-Phytate Soybean Protein Isolate and Concentrate by Ultrafiltration. American Association of Cereal Chemists, 1975. pp. 263-271.*
"Post turbidity of concentrated apple juice," Food and Science, part 2.1, p. 22-23 No. 1, vol. 19, 1998. (English language abstract enclosed).
"Study on enzymatic removal of phytic acid in soybean," China Western cereals & oils technology, p. 49-50, No. 3, vol. 25 (2000). (English language abstract enclosed).
"Overseas development trend of soybean proceeding food and proceeding technology," Jiangxi Food Industry, cols. 2-3, p. 37, vol. 6, 2004. (English language abstract enclosed).
European International Search Report with Provisional Opinion dated Feb. 1, 2006 (4 pgs).
Marks & Clerk letter to Shiga International Patent Office date-stamped Feb. 13, 2006 (1 pg).
Chinese Office Action issued in related Chinese Patent Application No. 200510120130.X dated Apr. 18, 2008 (9pgs including English translation.
Notice of Allowance dated May 26, 2009 issued in related Japanese Patent Application No. 2004-324333, pp. 1-6.

* cited by examiner

*Primary Examiner* — Kelly Bekker
(74) *Attorney, Agent, or Firm* — Grossman, Tucker, Perreault & Pfleger, PLLC

(57) ABSTRACT

The present invention provides a method of manufacturing a mixed beverage that offers an excellent flavor and superior preservation stability, and that contains vegetable juice etc. and soybean protein, and a mixed beverage that can be obtained by the manufacturing method. The method of the present invention for manufacturing a mixed beverage includes the following steps. (1) A first step for treating vegetable juice and/or fruit juice with pectin lyase, and then deactivating the pectin lyase. (2) A second step for pH adjusting the pectin lyase treated liquid obtained in the first step so that the final pH of the mixed beverage becomes 3.0 to 4.5. (3) A third step for adding low phytate soybean protein to the pH-adjusted liquid obtained in the second step.

4 Claims, No Drawings

METHOD OF MANUFACTURING MIXED BEVERAGE

BACKGROUND OF THE INVENTION

1. Field of the Invention

The present invention relates to a method of manufacturing a mixed beverage, more specifically to a method of manufacturing a mixed beverage that offers an excellent flavor and superior preservation stability, and that contains vegetable juice and/or fruit juice and soybean protein, and to a mixed beverage that can be obtained by the manufacturing method.

2. Description of the Related Art

Soybean is an excellent food as a source of protein nutrition. Consumption of this protein as a drink is a preferable form. However, soy milk precipitates in the weak acidic region where preservation stability is high, and also it does not have a flavor favorable to many people in the neutral region and hence its application has been limited.

For applications of soybean protein in the weak acidic region, addition of a stabilizing agent such as pectin (Patent Document 1) and addition of an emulsifying agent such as saccharose fatty acid ester of HLB13 or greater (Patent Document 2) have been known. Moreover, a method of inhibiting agglutination of soybean protein by adjusting the condition of passing its isoelectric point (Patent Document 3, and Patent Document 4) has also been proposed.

Furthermore, there is also a method in which after polyanionic substances have been removed from or deactivated and/or polycationic substances have been added in the solution containing soybean protein, a heating process at a temperature greater than 100° C. is performed under acidic conditions (Patent Document 5).

Moreover, soybean contains approximately 2% phytic acid, and phosphate compounds such as this phytic acid cause an uncomfortable, heavy feeling in the stomach. Accordingly, low phytate soybean protein beverage that is obtained by applying a phytate degradative enzyme to the soybean protein is known (Patent Document 6).

Moreover, vegetable juice and fruit juice have conventionally been consumed as health drinks. However, when mixing this vegetable juice or fruit juice with soy milk, complexes are formed causing turbidity and precipitation, resulting in a decrease in their product value. A drink has been disclosed which, in order to prevent the occurrence of this turbidity and precipitation, uses vegetable juice and/or fruit juice that have been treated with carboxylic ester hydrolase, then subjected to pectinase treatment as necessary, to adjust the pH of the drink to not more than 4.0 (Patent Document 7).

Patent Document 1: Japanese Unexamined Patent Application, First Publication No. Sho 54-52754
Patent Document 2: Japanese Unexamined Patent Application, First Publication No. Sho 58-20180
Patent Document 3: Japanese Unexamined Patent Application, First Publication No. Hei 7-16084
Patent Document 4: Japanese Unexamined Patent Application, First Publication No. Hei 12-77
Patent Document 5: International Publication No. WO02/067690 Pamphlet
Patent Document 6: Japanese Unexamined Patent Application, First Publication No. 2002-262838
Patent Document 7: Japanese Unexamined Patent Application, First Publication No. 2001-340069

However, even soybean protein that has been designed for application in the acidic region is unable to sufficiently prevent precipitation when used as a mixed beverage with vegetable juice and/or fruit juice. Moreover, in the method of treating vegetable juice and/or fruit juice with carboxylic ester hydrolase, turbidity and precipitation cannot always be adequately prevented. Furthermore, in the method of treating with pectinase, the enzyme treatment needs to be performed twice, resulting in a problem in terms of economical efficiency and amount of work.

Accordingly, an object of the present invention is to provide a method of manufacturing a mixed beverage that offers an excellent flavor and superior preservation stability, and that contains vegetable juice and/or fruit juice and soybean protein, and to provide a mixed beverage that can be obtained by this manufacturing method.

SUMMARY OF THE INVENTION

The present inventors have earnestly carried out examination for solving the above problems. As a result, they found that a mixed beverage containing vegetable juice and/or fruit juice and soybean protein that has an excellent flavor and superior preservation stability and also has excellent economical efficiency and manufacturing efficiency, can be manufactured by: treatment using a pectin lyase that is different from carboxylic ester hydrolase and pectinase; addition of low phytate soybean protein; and adjustment to a predetermined pH value. Thereby, the present invention has been completed.

That is, a first aspect of the present invention is a method of manufacturing a mixed beverage comprising the steps of:

(1) treating vegetable juice and/or fruit juice with pectin lyase, and then deactivating the pectin lyase;

(2) adjusting the pH of the pectin lyase treated liquid obtained in the step (1) so that the final pH of the mixed beverage becomes 3.0 to 4.5;

(3) adding low phytate soybean protein to the pH-adjusted liquid obtained in the step (2).

Moreover, a second aspect of the present invention is a method of manufacturing a mixed beverage comprising the steps of:

(1) treating vegetable juice and/or fruit juice with pectin lyase, and then deactivating the pectin lyase.

(2') adding low phytate soybean protein to the pectin lyase treated liquid obtained in the step (1).

(3') adjusting the pH of the soybean protein added liquid obtained in the step (2') so that the final pH of the mixed beverage becomes 3.0 to 4.5.

Furthermore, a third aspect of the present invention is to provide a mixed beverage that is obtained by the manufacturing method.

The mixed beverage that is obtained by the method of the present invention has an excellent flavor and also superior preservation stability.

DETAILED DESCRIPTION OF THE PREFERRED EMBODIMENTS

Polygalacturonase, which hydrolyzes the $\alpha$-1, 4-bond in polygalacturonic acid, and pectin esterase, which acts on methylester site to demethylate, and generates free carboxylic acid, are commonly known as pectin hydrolases. Both of these are hydrolases, and they have the effect of decomposing soluble pectin to reduce its viscosity.

Pectin lyase (enzyme (EC4.2.2.10)) differs from polygalacturonase in that it decomposes $\alpha$-1, 4-bonds of polygalacturonic acid by $\beta$-elimination reaction. The reason why the mixed beverage has excellent flavor and superior preservation stability in the case where pectin lyase is used compared to the case of using polygalacturonase or pectin esterase is not exactly clear. However, since the effect of pectin lyase on pectin differs from that of polygalacturonase and pectin esterase, the reason is presumed to be that the pectin decomposed product has a structure that does not easily form a complex together with low phytate soybean protein.

Pectin lyase is a commonly known enzyme, and any enzyme that decomposes the $\alpha$-1, 4-bond of polygalacturonic acid by $\beta$-elimination reaction can be used. For example, a pectin lyase producing fungus such as *Aspergillus niger* is cultured on an appropriate culture medium, and the crude enzyme that can be obtained from the produced cultures by common enzyme purification methods such as extraction, salting out using ammonium sulfate, and precipitation, and further purified enzymes, can be used. Alternatively, it can be obtained by using commonly known recombinant DNA technology. Normally in a method like this, in a culture medium under conditions that allow enzyme expression and collection of the enzyme from the cultures, host cells that have been transformed by a recombinant DNA vector that can express and can transfer a DNA sequence that encodes pectin lyase are cultured. An example of a commercial product is, for example, pectin lyase formulation, Sumizyme LC, manufactured by SHIN-NIHON-KAGAKU-KOGYO, Inc. Moreover, P7052 produced from *Aspergillus niger*, P2804 produced from *Aspergillus japonicus*, P5936 produced from *Aspergillus japonicus*, P2679 produced from *Aspergillus japonicus*, and the like are commercially offered by Sigma, Inc. Furthermore, pectin lyase enzymes of product names LS04297, LS04298 and LS04296 produced from *Aspergillus niger* are commercially offered by Worthington, Inc.

The material vegetables of the vegetable juice used in the present invention are tomato, spinach, pumpkin, carrot, celery, beet, parsley, cabbage, lettuce, cress, Chinese cabbage, kale, eggplant, asparagus and the like, and one, two, or more kinds of these vegetables can be used. For vegetable juice, one of either the juice extracted from these vegetables using a common method, concentrated or diluted extracted juice, juice produced from crushed and strained vegetables or the like is appropriate. Also, juice with added salt, sugar, fruit sugar, flavoring ingredients, acidulant or the like may be used as necessary.

The material fruits for the fruit juice used in the present invention are apple, grapefruit, peach, pineapple, orange, grape, kiwi fruit, strawberry, blueberry, raspberry, prune, cranberry, banana, cherry, persimmon, fig and the like, and one, two or more kinds of these fruits can be used. For fruit juice, one of either the juice extracted from these fruits using a common method, concentrated or diluted extracted juice, juice produced from crushed and strained fruits or the like is appropriate. Also, juice with added salt, sugar, fruit sugar, flavoring ingredients, acidulant or the like may be used as necessary.

Moreover, the juice may be a mixture of vegetable juice and fruit juice. The concentration of the vegetable juice and fruit juice in the mixed beverage of the present invention is not particularly limited, and the juice may be contained up to a concentration for a maximum concentrate.

The total amount of vegetable juice and fruit juice with respect to the mixed beverage is preferably 25% by mass or more, and it is more preferably 50% by mass or more, in consideration of the nutrition and functionality of the mixed beverage.

A first aspect of the present invention involves firstly treating the vegetable juice and/or fruit juice with pectin lyase, and then after the treatment, deactivating the pectin lyase [step (1)]. If enzymes other than pectin lyase, for example, polygalacturonase, pectin esterase or the like are used, a mixed beverage having an excellent flavor and superior preservation stability cannot be obtained.

The dosage of pectin lyase with respect to vegetable and/or fruit juice is 0.0001 to 2% by mass, preferably 0.0005 to 1.0% by mass, and more preferably 0.001 to 0.5% by mass. The temperature of the enzyme treatment is preferably 30 to 70° C. and it is more preferably 40 to 65° C. A preferable pH is 2.0 to 6.0 and a more preferable pH is 2.5 to 5.5. The treatment is performed for preferably 10 minutes to 10 hours, and more preferably for 1 hour to 5 hours.

The treatment using pectin lyase is performed until the amount of water-soluble pectin becomes preferably 15 mg % or less, and more preferably 10 mg % or less. As a result, a mixed beverage that does not have precipitation and has a more excellent flavor can be obtained.

After the treatment with pectin lyase, the pectin lyase is deactivated. The method of deactivating the pectin lyase is not particularly limited. However, a heating method is preferable as the effect thereof on other components is small. The heating temperature is preferably 75° C. or more, and more preferably 80° C. or more. Heating is performed for preferably 1 minute or more, and more preferably for 5 minutes or more.

Next, the pectin lyase treated liquid obtained in the step (1) is adjusted so that the final pH of the mixed beverage becomes 3.0 to 4.5, and more preferably 3.0 to 4.0 [step (2)]. In the case where the pH is greater than 4.5, precipitation occurs, resulting not only in poor preservation stability but also in undesirable flavor. Moreover, if the pH is less than 3.0, it causes an overly strong acidic flavor, resulting in undesirable flavor. The pH adjustment can be performed using acid, alkali, and salt for use in food products. Examples of acids are citric acid, acetic acid, fumaric acid, malic acid, and tartaric acid. Examples of alkalis are sodium hydroxide, potassium hydroxide and calcium hydroxide. Examples of salts are sodium carbonate and potassium carbonate. Moreover, the dosages of acid, alkali, and salt are preferably determined by carrying out a pretest beforehand, taking into account the dosage of low phytate soybean protein in the step (3) and so forth.

Next, low phytate soybean protein is added to the pH adjusted liquid obtained in the previous step [step (3)].

Low phytate soybean protein can be obtained for example by processing soybeans as described below.

Soy milk is made from an extract from defatted soybeans, and the soy milk is pH adjusted to obtain an acid precipitated curd. The acid precipitated curd is then applied with phytase, which has the phytate degrading activity. In the case where hydrolysis of protein is not desirable, the protease activity of phytase is preferably none or low. If protease activity is high, protein is hydrolyzed by protease resulting in an increase in a low molecular decomposition product which causes a problem of deterioration in flavor. For example a mode where there is no or low protein hydrolyzation by protease can be defined such that the protein TCA solubilization ratio after the action of the phytate degradative enzyme is 20% or less, and preferably 15% or less. The source of phytase is not particularly limited as long as it is an enzyme or enzyme agent that has a phytate degrading activity satisfying the above condition. However, since phytase derived from microorganisms generally has a higher phytate degrading activity and a lower coexisting protease activity than plant-derived phytase, the microorganism-derived phytase has a greater advantage in terms of prevention of hydrolysis and decay of protein. In the present invention, the amount of phytic acid with respect to protein is preferably 1% by mass or less, or more preferably 0.5% by mass or less. For example, usually in acid precipitated curd of an extracted liquid from which bean curd refuse has been removed from water-extracted defatted soybeans, approximately 2% by mass of phytic acid is contained per protein mass. Therefore in this case, it is appropriate to decompose the phytic acid so that the content thereof becomes approximately 50% or less of the pre-reaction state. As long as the above conditions are satisfied, the condition of phytase can be applied in respective optimal conditions, and they are not particularly limited. Correspondingly, their methods of application are not limited either. For an example of such conditions, the application may be within the ranges of preferably pH 2.5 to 7.5, temperature 20 to 70° C., dosage 0.1 to 100 units/g per solid content, more preferably, 0.5 to 50 units/g, and in usually 5 minutes to 3 hours. However, as long as denaturation and decay of the protein can be avoided, the application may take place outside the above range. If the treatment is required to be performed as quickly as possible, the enzyme of high unit dosage can be applied. Furthermore, 1 unit of phytase activity indicates an enzyme amount that liberates 1 μmol of phosphoric acid from the phytic acid serving as a substrate in one minute of the initial reaction period under standard conditions (pH 5.5, 37° C.). The degree of decomposition of phytic acid and its salt can be found by directly measuring the phytic acid content in the solution in accordance with the Alii Mohamed method (Cereal Chemistry 63, 475, 1986).

As a method of reducing the level of phytin, there are, for example, membrane processes such as dialysis, ultrafiltering, electrodialysis, and an ion exchange resin process.

Moreover, for soybean protein, soybean protein that has been fractionated into respective components in accordance with common procedures may be used.

It is considered that low phytate soybean protein obtained in this way has a high absolute value of surface charge on soybean protein, and high solubility within a weak acidic region.

The content of low phytate soybean protein with respect to the mixed beverage is preferably 2% by mass or more, and more preferably 3% by mass or more, in consideration of nutrition and functionality of the mixed beverage.

The mixed beverage obtained in the step (3) has an excellent flavor and superior preservation stability, and by filling this in a container after sterilizing it in accordance with common procedures, it can be made into a commercial product.

The step (1) of a second aspect of the present invention is the same as that of the first step of the first aspect of the present invention.

The step (2') of the second aspect of the present invention is a step for adding low phytate soybean protein to a pectin lyase treated liquid. The low phytate soybean protein and dosage thereof are the same as that of the step (3) of the first aspect of the present invention.

The step (3') of the second aspect of the present invention is a step for adjusting the soybean protein added liquid obtained in the step (2') so that the final pH of the mixed beverage becomes 3.0 to 4.5 or preferably 3.0 to 4.0. The acid, alkali, and salt used for pH adjustment are same as that of the second step of the first aspect of the present invention.

By filling the mixed beverage obtained in the third step in a container after sterilizing it in accordance with common procedures, it can be made into a commercial product.

A third aspect of the present invention is the mixed beverage obtained by the manufacturing method of the first and second aspects, and it has an excellent flavor and superior preservation stability.

Furthermore, the mixed beverage of the present invention may include: sugars such as monosaccharides such as glucose, oligosaccharides such as saccharose, polysaccharides such as carrageenan and starch; salts such as sodium chloride; flavoring ingredients; and coloring; insofar as the effect of the present invention is not lost.

Example 1

Sample 6 (Preparation of Low Phytate Soybean Protein)

Soybeans were pressurized, and then oil therein was extracted, separated, and removed using n-hexane as an extraction solvent to obtain low denatured defatted soybeans. To 5 kg of the obtained low denatured defatted soybeans (nitrogen solubility index (NSI) 91) was added 35 kg of water, and the pH was adjusted to 7 using diluted sodium hydroxide solution. Next, it was extracted while stirring for one hour at room temperature, and then centrifuged at 4000 G to separate bean curd refuse and insolubles, to obtain defatted soybean milk. The pH of this defatted soybean milk was adjusted to 4.5 using phosphoric acid, and then centrifuged using a continuous centrifugal separator (decanter) at 2000 G, to obtain an insoluble fraction (acid precipitated curd) and a soluble fraction (whey). Water was added so that the acid precipitated curd became 10% by mass of solid content, to obtain an acid precipitated curd slurry. After the pH of this was adjusted to 4.0 using phosphoric acid, it was heated to 40° C. To this solution (phytic acid content 1.96% by mass; solid content, TCA solubilization ratio 4.6%) was added phytase (manufactured by NOVO, Inc.) of equivalent to 8 units per solid content, allowing the enzymes to act for 30 minutes. After the reaction, the pH of this enzyme-applied product (phytic acid content 0.04% by mass; solid content, TCA solubilization ratio substantially unchanged) was adjusted to 3.5, and heat treatment was performed at 120° C. for 15 seconds, using a continuous direct heat treatment sterilizer. This was then spray dried, to obtain 1.5 kg of low phytate soybean protein powder. The dissolution ratio of this protein (pH 3.5) was 95%.

Moreover, the dissolution ratio (scale of protein solubilization with respect to solvent (%)) and the TCA solubilization ratio (scale of protein decomposition ratio) were measured using the following method.

Dissolution ratio: protein powder was dispersed in water until the protein became 5.0% by mass, and sufficiently stirred. The solution was pH adjusted as necessary, then centrifuged at 10000 G for 5 minutes. Then the ratio of the supernatant protein to the total protein was measured using a protein quantitative determination method such as the Kjeldahl method and the Lowry process.

TCA solubilization ratio: protein powder was dispersed in water until the protein became 1.0% by mass, and sufficiently stirred. The ratio of 0.22M trichloroacetic acid (TCA) soluble protein to the total protein was measured by a protein quantitative determination method such as the Kjeldahl method and the Lowry process.

(Preparation of the Mixed Beverage)

0.2% by mass of Sumizyme LC (pectin lyase formulation manufactured by SHIN-NIHON-KAGAKU-KOGYO, Inc.) was added to tomato juice (20° C.) of Brix 5%, and it was subjected to enzymatic treatment at 60° C. for 2 hours. After completion of the enzymatic treatment, heat was applied at 80° C. to deactivate the enzymes. The water-soluble pectin content at this point was 15 mg %. The water-soluble pectin content was measured by the method described below. Moreover, the content of the vegetable juice (tomato juice) in the enzyme treated liquid was 100% by mass. Next, the enzyme-treated tomato juice was added with low phytate soybean protein so that it become 2% by mass, and then the juice was stirred to dissolve the low phytate soybean protein, and the pH adjusted to 3.6 using citric acid. After adjusting the pH the mixed tomato/low phytate soybean protein juice was homogenized using a homogenizer (SANWA Co, Ltd., H20), to obtain a mixed beverage.

Measurement of water-soluble pectin content (DMP method): 100 mL of sample was added with 400 mL of 70% ethanol, which was then left at 100° C. for 15 minutes to extract alcohol insoluble solid content. This was then centrifuged at 3000 rpm for 10 minutes, and then washing, dehydration and drying under reduced pressure were performed to prepare the alcohol insoluble solid content. This was added with 0.25 ml of 2% sodium chloride and 4 ml of sulfuric acid, and left at 70° C. for 10 minutes while being stirred. After this had been cooled, 0.2 mL of coloring reagent was added and it was kept at room temperature for 10 minutes. Then, the water-soluble pectin content was calculated from the differential light absorption of 450 nm and 400 nm.

Samples 1 to 5, and 7 to 10.

The mixed beverage was prepared as with sample 6 except that the pH of the mixed beverage in sample 6 was adjusted to the values shown in Table 1 using citric acid or tartaric acid Samples 11 to 14

For sample 11, the mixed beverage was prepared as with sample 6, except that the soybean protein used was not the low phytate type in sample 6. For samples 12 to 14, the mixed beverage was prepared as with sample 6, except that the enzymes shown in Table 1 were used instead of the pectin lyase in sample 6.

The viscosity of each mixed beverage measured on a Brookfield viscometer (60 rpm, 20° C.), the presence of precipitation (25° C., preserved for a month), and the result of a sensory evaluation are shown in Table 1.

Evaluation Standards of the Sensory Evaluation
A: Excellent
B: Satisfactory
C: Unsatisfactory precipitation formation and their flavor was excellent. Samples 2 and 3, in which the pH was 4.1 to 4.5, did not exhibit precipitation formation and their flavor was also satisfactory. Sample 11, in which the soybean protein used was not the low phytate type, and samples 12 to 14, in which the tomato juice had been treated with enzymes other than pectin lyase, had unsatisfactory flavor. Furthermore, samples 11 and 12 exhibited precipitation formation.

Example 2

A mixed beverage was prepared as with sample 6, except that the enzyme-treated tomato juice was pH adjusted to 3.6, and then low phytate soybean protein was added so that it became 2% by mass in sample 6. The mixed beverage thereby produced had a superior preservation stability (25° C., 1 month preservation), and also had an excellent flavor.

The present invention can be used in the field of health drinks.

What is claimed is:

1. A method of manufacturing a mixed beverage consisting of:
  (1) treating vegetable juice and/or fruit juice with 0.0001 to 2% by mass of pectin lyase, at the temperature of 30 to 70° C., and the pH of 2.0 to 6.0, for 10 min. to 10 hours, and then deactivating the pectin lyase; subsequently
  (2) adjusting the pH of the pectin lyase-treated liquid obtained in the step (1) so that the final pH of the mixed beverage becomes 3.0 to 4.5; and subsequently
  (3) adding low phytate soybean protein to the pH-adjusted liquid obtained in the step (2), wherein the low phyate soybean-added liquid obtained in the step (3) shows no precipitation after preservation at 25° C. for one month.

2. A method of manufacturing a mixed beverage consisting of:
  (1) treating vegetable juice and/or fruit juice with 0.0001 to 2% by mass of pectin lyase, at the temperature of 30 to

TABLE 1

| Classification | Enzyme | pH | Vegetable (%) | Soybean protein Type | Conc. (w/w) | Precipitation | Brookfield type viscometer | Sensory evaluation |
|---|---|---|---|---|---|---|---|---|
| 1 | PL | 4.7 | 100 | LPSP | 2 | X | 300 | C |
| 2 | PL | 4.5 | 100 | LPSP | 2 | ○ | 405 | B |
| 3 | PL | 4.1 | 100 | LPSP | 2 | ○ | 392 | B |
| 4 | PL | 3.9 | 100 | LPSP | 2 | ○ | 385 | A |
| 5 | PL | 3.7 | 100 | LPSP | 2 | ○ | 382 | A |
| 6 | PL | 3.6 | 100 | LPSP | 2 | ○ | 375 | A |
| 7 | PL | 3.5 | 100 | LPSP | 2 | ○ | 372 | A |
| 8 | PL | 3.0 | 100 | LPSP | 2 | ○ | 175 | A |
| 9 | PL | 2.5 | 100 | LPSP | 2 | ○ | 150 | C |
| 10 | PL | 2.0 | 100 | LPSP | 2 | ○ | 138 | C |
| 11 | PL | 3.6 | 100 | SP | 2 | X | 85 | C |
| 12 | PME | 3.6 | 100 | LPSP | 2 | X | 275 | C |
| 13 | PME + SN | 3.6 | 100 | LPSP | 2 | ○ | 388 | C |
| 14 | SN | 3.6 | 100 | LPSP | 2 | ○ | 450 | C |

PL: Pectin lyase (Sumizyme LC)
PME: Pectin methylesterase (Sumizyme PME)
SN: Pectinase (Sucrase N)
LPSP: Low phytate soybean protein
SP: Soybean protein Sample 1, in which the pH of the mixed beverage exceeded 4.5, failed to prevent the formation of precipitation, and its flavor was unsatisfactory. Samples 9 and 10, in which the pH of the mixed beverage was 2.5 or less, did not exhibit precipitation formation, however their flavor was unsatisfactory. Samples 4 to 8, in which the pH was 3.0 to 3.9 did not exhibit 70° C., and the pH of 2.0 to 6.0, for 10 min. to 10 hours, and then deactivating the pectin lyase; subsequently
  (2') adding low phytate soybean protein to the pectin lyase-treated liquid obtained in the step (1); and subsequently
  (3') adjusting the pH of the soybean protein added liquid obtained in the step (2') so that the final pH of the mixed beverage becomes 3.0 to 4.5, wherein the pH-adjusted liquid obtained in the step (3') shows no precipitation after preservation at 25° C. for one month.

3. A method of manufacturing a mixed beverage according to claim 1, wherein treating the vegetable juice and/or fruit juice with pectin lyase in (1) is conducted until the amount of water-soluble pectin becomes 15 mg % or less per vegetable juice and/or fruit juice.

4. A method of manufacturing a mixed beverage according to claim 2, wherein treating the vegetable juice and/or fruit juice with pectin lyase in (1) is conducted until the amount of water-soluble pectin becomes 15 mg % or less per vegetable juice and/or fruit juice.

* * * * *